United States Patent

Daniel

[11] Patent Number: 5,964,041
[45] Date of Patent: Oct. 12, 1999

[54] GUIDE TOOL

[76] Inventor: Jerry R. Daniel, 303 W. Ave. F, Garland, Tex. 75040

[21] Appl. No.: 08/905,844

[22] Filed: Aug. 4, 1997

[51] Int. Cl.⁶ .............................. B43L 7/00; B26D 5/02; B26D 7/02
[52] U.S. Cl. .............................. 33/403; 83/745; 83/455; 83/466; 33/443; 33/489; 33/566
[58] Field of Search .............................. 33/640, 641, 430, 33/443, 484, 485, 489, 490, 562, 566; 83/745, 455, 466

[56] References Cited

U.S. PATENT DOCUMENTS

| | | | |
|---|---|---|---|
| 2,708,465 | 5/1955 | Huebner et al. | 143/47 |
| 2,942,633 | 6/1960 | King | 83/745 |
| 3,186,452 | 6/1965 | Magnussen | 143/47 |
| 3,373,781 | 3/1968 | Grosswald | 143/167 |
| 3,829,231 | 8/1974 | Hamilton | 408/108 |
| 4,059,038 | 11/1977 | Rietema | 83/745 |
| 4,075,920 | 2/1978 | Neal | 83/745 |
| 4,077,292 | 3/1978 | Cole | 83/745 |
| 4,291,602 | 9/1981 | Fast et al. | 83/745 |
| 4,307,513 | 12/1981 | Genge | 30/372 |
| 4,356,748 | 11/1982 | Tilton | 83/745 |
| 4,381,103 | 4/1983 | Ferdinand et al. | 83/745 |
| 4,394,800 | 7/1983 | Griset | 33/433 |
| 4,463,644 | 8/1984 | Ferdinand et al. | 83/745 |
| 4,619,170 | 10/1986 | Maier et al. | 83/745 |
| 4,919,384 | 4/1990 | Grimberg | 83/745 |
| 5,138,759 | 8/1992 | Gruetzmacher | 29/467 |
| 5,365,822 | 11/1994 | Stapleton et al. | 83/745 |

*Primary Examiner*—Diego Gutierrez
*Assistant Examiner*—Pia Tibbits
*Attorney, Agent, or Firm*—Jenkens & Gilchrist P.C.

[57] ABSTRACT

A guide tool for performing a work function step such as cutting or drawing a line along a workpiece including a guide plate having planar opposite sides, a longitudinal slot, a first straight guide edge substantially parallel with the slot, guide flanges along opposite sides of the slot defining a guide channel on a first side of the guide plate, and two clamps adapted for assembly with guide plate, the clamps having a first jaw including a guide member slidable along the guide plate channel and a second jaw extendable through the guide plate slot and a pressure plate for securing the clamps to a workpiece along opposite sides of the workpiece, and clamp handles formed integral with the jaws and spring biased apart to urge the jaws together for clamping the guide plate to the workpiece, and the clamp handles being positioned in spaced relation from the first side of the guide plate for ready access by a user from the first side of the guide plate when the clamps are assembled with the guide plate and the guide plate is positioned on a workpiece.

8 Claims, 5 Drawing Sheets

FIG. 1

GUIDE TOOL

BACKGROUND OF THE INVENTION

1. Field of the Invention

The present invention relates to a guide tool and more particularly relates to a guide tool which may be releasably clamped to a workpiece for performing a work function step on the workpiece, such as drawing a straight reference line along the workpiece or cutting the workpiece along a desired reference line.

2. Description of the Prior Art

A significant number of tool designs for performing a straight line work function on a workpiece are known in the prior art. Among the most relevant of such prior art designs are the guides shown in U.S. Pat. Nos. 5,365,822 and 3,829,231. A similar but somewhat more complex, guide is shown in U.S. Pat. No. 4,381,103. Still other prior art guide devices are illustrated in the following U.S. Pat. Nos.: 4,307,513; 4,463,644; 4,619,170; 3,186,452; 5,138,759; 4,075,920; 4,059,038; 4,077,292; 4,356,748; 4,291,602; 4,919,384; and 3,373,781.

The guide tool of the present invention departs in several respects from the designs of the prior art tools to permit the tool to be secured to a workpiece for the work step function to be performed at any desired angle across the workpiece and to permit the steps of installation of the guide to be performed by a single workman utilizing both hands at positions above the guide tool and the workpiece. Further, the guide tool may be readily and quickly assembled for use and disassembled for packing and transport between jobs.

SUMMARY OF THE PRESENT INVENTION

Principal features of the present invention are the simple construction along with the ease of operation and quick assembly and disassembly. In accordance with the present invention, a guide tool is provided which includes: a guide plate having planar opposite sides; a first straight guide edge extending substantially parallel with the longitudinal axis of the plate; a longitudinal slot extending along an axis substantially parallel with the guide edge and of a length shorter than the guide plate; guide rails or flanges along opposite sides of the slot defining a guide channel along a first planar side of the guide plate encompassing the slot; and spring biased movable clamps coupled with the guide plate along the guide channel including a first clamp jaw secured with a guide member slidable in the guide channel and a second clamp jaw extendable through the slot connected with a pressure plate spring biased toward the second planar face of the guide plate for clamping a workpiece between the second face of the plate and the pressure plate to secure the pressure plate to the workpiece along opposite edges of the workpiece for holding the pressure plate and guide edge against the workpiece to perform a work step function such as cutting the workpiece or drawing a straight guide line along the workpiece surface.

BRIEF DESCRIPTION OF THE DRAWINGS

The invention and its objects and advantages will be better understood by reference to the following detailed drawings wherein.

DESCRIPTION OF THE PREFERRED EMBODIMENT

Figure 1:
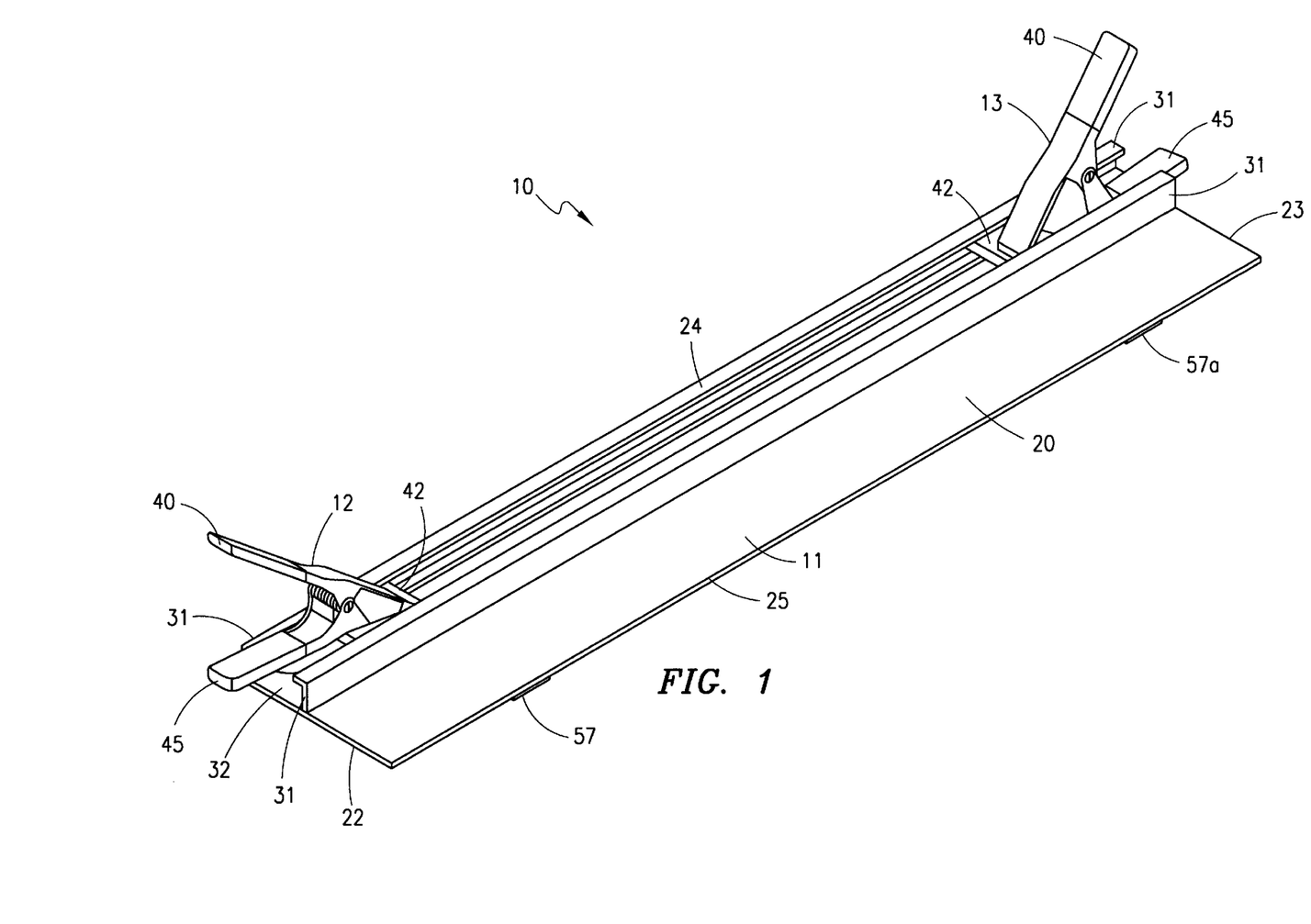
FIG. 1 is a perspective view of a guide tool of the present invention.
Figure 4:
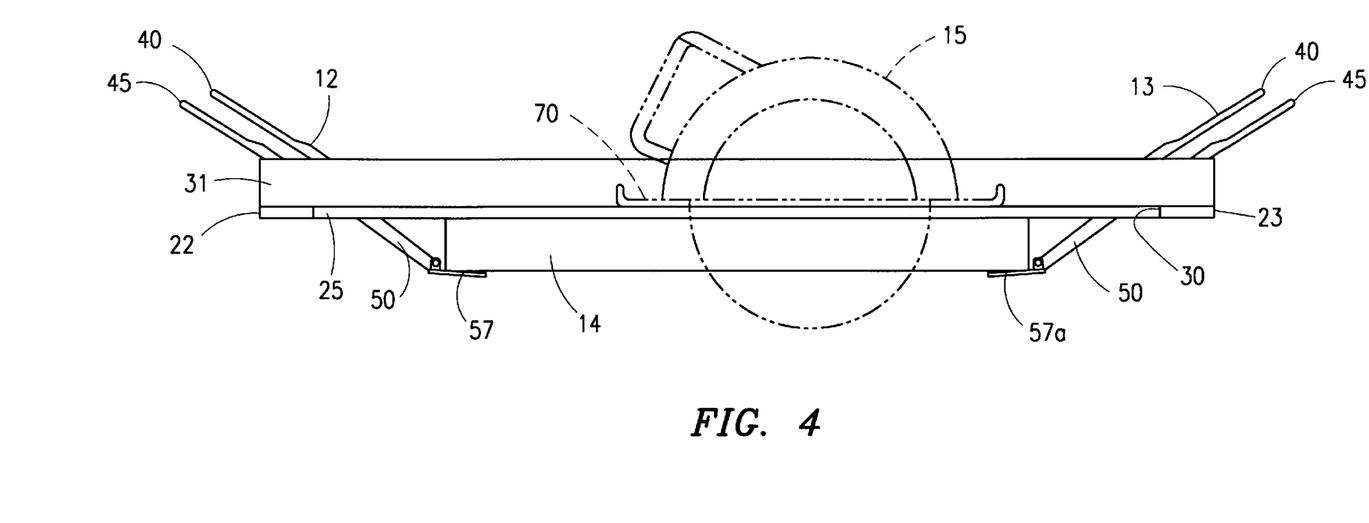
FIG. 4 is an edge or side view of the guide tool installed on a workpiece schematically showing in phantom lines a circular saw for cutting the workpiece.

Referring to FIG. 1, a guide tool 10 embodying the features of the invention includes a guide plate 11 and movable clamps 12 and 13. The clamps are employed to secure the guide plate to a workpiece 14 as illustrated in FIGS. 4 and 6 while the workpiece is cut with a circular saw 15 guided along a designated straight line by the guide plate.

Referring to FIGS. 1, and 7–10, the guide plate 11 is a rectangular member having a first planar top surface 20, a second planar bottom surface 21, first and second opposite end edges 22 and 23, a first back edge 24, and a second front guide edge 25. The guide plate is provided with a longitudinal clamp slot 30 having a longitudinal axis parallel with the guide edge 25. The slot 30 has opposite ends terminating near the opposite ends of the guide plate so that the slot extends substantially the full length of the plate. Two clamp guide flanges are secured along the first top surface 20 of the guide plate extending the full length of the guide plate along opposite sides of the clamp slot 30. The flanges 31 may be secured as by welding to the surface of the guide plate. The flanges 31 are inverted L-shaped in cross section mounted in opposed parallel relationship along opposite sides of the slot 30 defining with the surface 20 of the guide plate a longitudinal clamp guide channel 32. The guide channel 32 is rectangular in cross section opening through the slot 30 in the guide plate. The space between the flanges defines an opening 33 into the full length of and along the side of the guide channel opposite the guide plate surface 20. The guide channel 32 is open at opposite ends to permit assembly of the clamps 12 and 13 with the guide plate. The guide plate 11 may be formed of any suitable structurally strong light material such as aluminum, plastic, steel, and the like. Embodiments of the guide tool constructed for use with a circular saw and the like are preferably formed of a strong metal. Guide plates designed for use with marking pens and knives may be formed of strong plastic sheet material.

Figure 5:
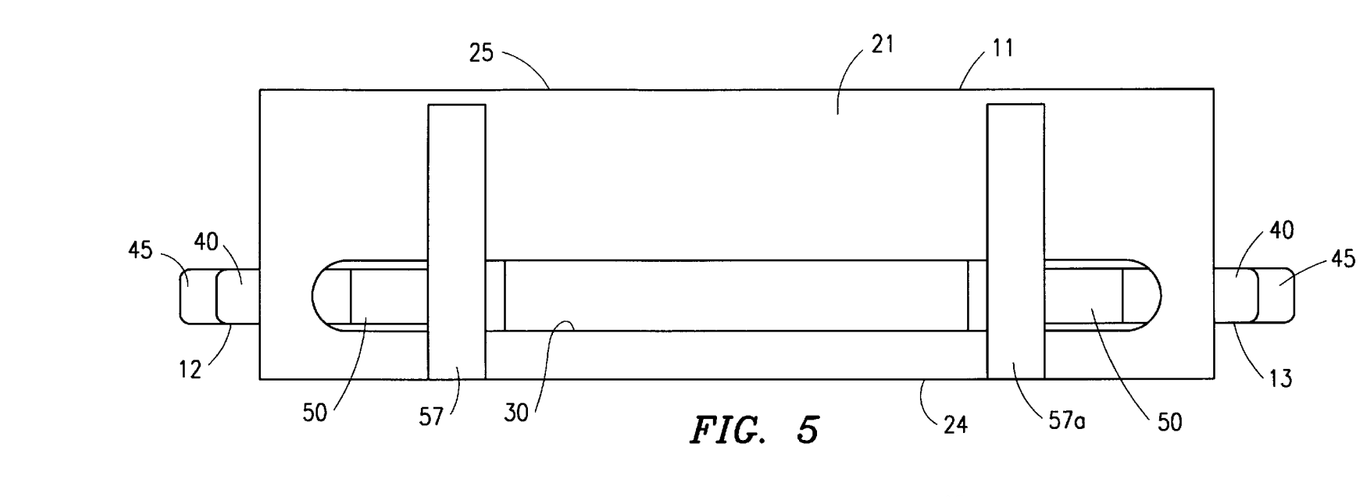
FIG. 5 is a bottom plan view of the guide tool as illustrated in FIG. 1.
Figure 6:
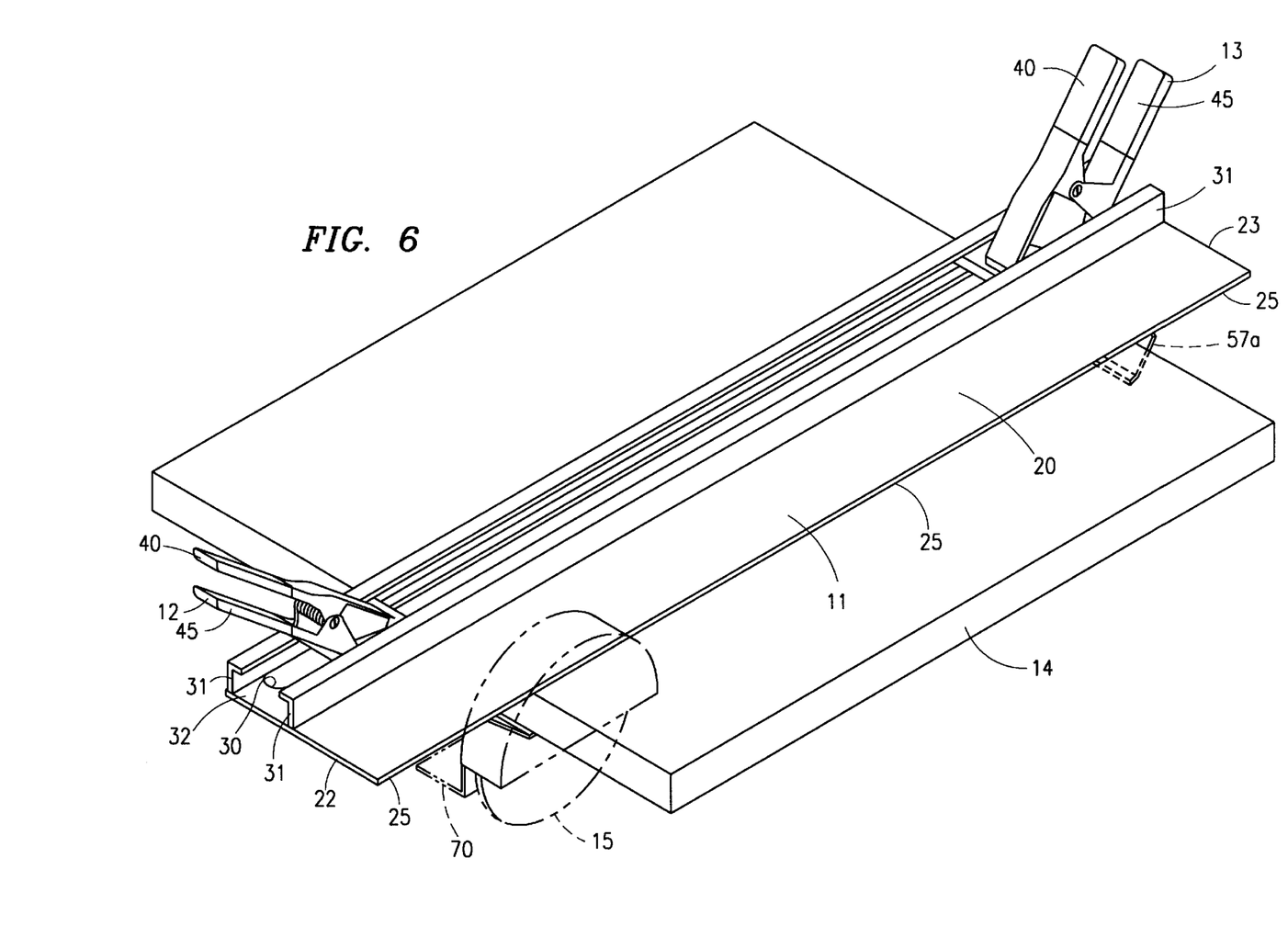
FIG. 6 is a perspective view of the guide tool mounted on a workpiece as illustrated in FIG. 4 showing in phantom lines a circular saw for cutting the workpiece.
Figures 7, 8, 10:
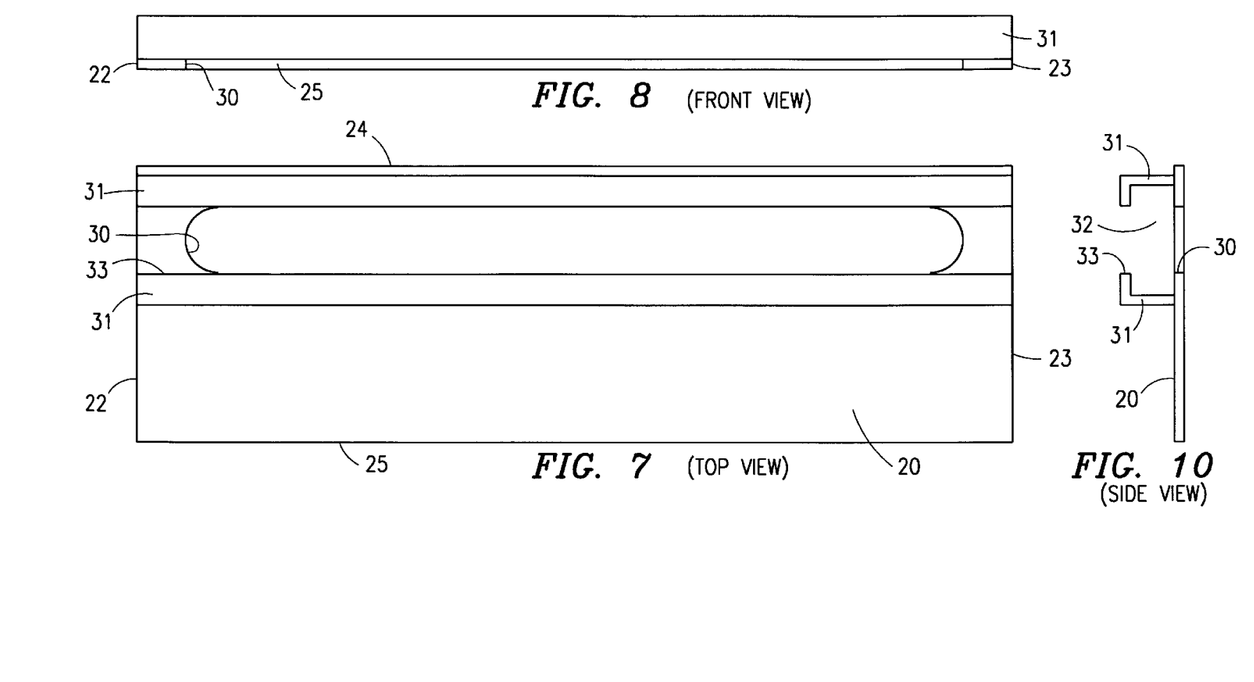
FIG. 7 is a top plan view of the guide plate of the guide tool of the invention.
FIG. 8 is a front edge view of the guide plate of FIG. 7.
FIG. 10 is a end or side view of the guide plate as seen in FIG. 7.
Figure 9:
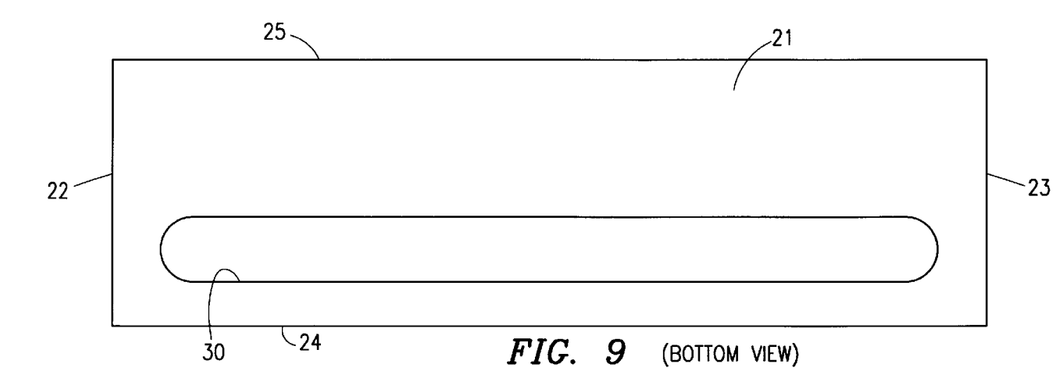
FIG. 9 is a bottom view of the guide plate of FIGS. 7 and 8.

The clamps 12 and 13 are identical in structure except that the clamp 12 shall be referred to as a left-hand clamp and the clamp 13 as a right-hand clamp as viewed in FIGS. 1 and 4–6. The left-hand clamp 12 is shown in detail in FIG. 3. The clamp 12 has a first upper handle 40 formed integral with an upper jaw 41. A clamp guide 42 is secured with the upper jaw 41. The clamp guide 42 is an open sided member rectangular in cross section sized to fit within and slide along the guide channel 32. The clamp guide 42 has a top 43 and opposite sides 44. The guide top 43 fits within the guide channel inside the flanges 31 while the opposite sides 44 of the clamp guide fit between the opposite flanges 31. The clamp 12 has a second lower handle 45 and an integral lower jaw 50. The upper and lower jaws 41 and 50 are coupled together by a jaw pin 55 which pivotally connects the handles and jaws together at the juncture of the handles with the jaws 41 and 50 so that movement of the handles in either direction effects opposite direction movement of the jaws. A spring 56 wound around the jaw pin 55 and engaging the handles biases or urges the handles apart thereby squeezing or urging the jaws together. A pressure plate or blade 57 provided with a mounting bracket 58 is secured by a pin 59 to the lower jaw 50. The pin 59 extends through holes 60 in the bracket and holes 65 in the lower jaw 50 of the clamp 12. The sizing of the pin 59 and the holes 60 permits ready installation and removal of the pin through the holes for connecting and disconnecting the lower clamp jaw 50 and the pressure plate 57. The design of the lower jaw 50 with the blade 57 and the bracket 58 permits very limited pivoting of the blade relative to the lower jaw so that the blade may lie flush with the bottom surface 21 of the plate and the bottom surface of the workpiece 14 when the tool is in use as described hereinafter. The right-hand clamp 13 is identical to the left-hand clamp 12 except that the plate 57a is connected with the lower jaw 50 of the clamp 13 by a bracket 58 which is located along the other end portion of the plate so that with the right clamp 13 located at the right end of the guide plate as shown in FIG. 6, the major portion of the clamp plate extends toward the straight edge 25 of the plate. It will be evident from FIG. 1 that the clamps 12 and 13 face in opposite directions when installed on the plate 11, and thus, the pressure blades 57 must face in opposite direction on the lower jaw of each of clamp. As explained hereinafter, the clamps 12 and 13 are assembled with the guide plate for use of the tool but may be readily disassembled from the guide plate for storage and transport of the tool.

OPERATION OF THE INVENTION

Figures 2, 3:
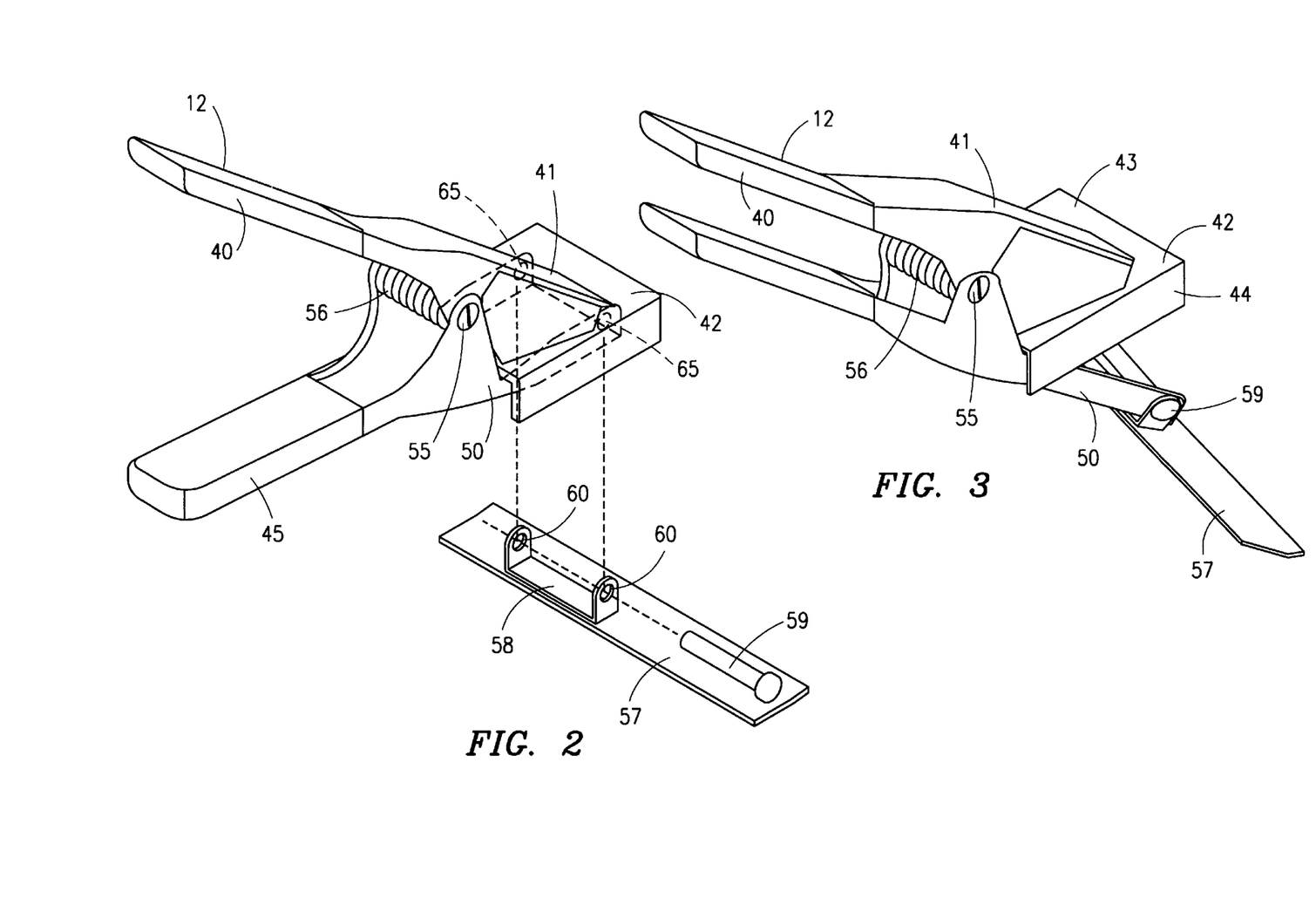
FIG. 2 is an enlarged exploded view in perspective of one of the clamps of the guide tool of FIG. 1.
FIG. 3 is a view in perspective of the clamp of FIG. 2 with the clamp handles squeezed together to separate the clamp jaws for showing the coupling of the pressure plate to the lower clamp jaw.

Preliminary to use of the guide tool 10, the clamps 12 and 13 are assembled with the guide plate 20 as illustrated in FIGS. 1 and 5. The assembly will be described with respect to the clamp 12 in the following manner, though it is to be understood that both the clamps 12 and 13 are assembled with the guide plate following the same steps. Assuming that the pressure plate 57 is attached to the lower jaw 50 of the clamp as illustrated in FIG. 3, the pressure plate must first be removed from the clamp jaw before the clamp can be assembled with the guide plate. The handles 40 and 45 of the clamp are squeezed together against the force of the spring 56 separating the jaws 41 and 50 to the positions of FIG. 3. The pin 59 is then removed from the holes 60 in the bracket 58 and the holes 65 in the lower clamp jaw 50. With the pressure plate removed, the remaining parts of the clamp will appear as in the upper portion of FIG. 2. The clamp, without the pressure plate 57, is then positioned at the left end 22 of the guide plate 11, in the orientation of the parts shown in FIG. 1, with the clamp guide 42 being aligned with the open end of the guide channel 32. The clamp is moved toward the guide channel inserting the clamp guide 42 into the open end of the guide channel 32 moving the clamp toward the center of the guide plate until the lower jaw is past the left end of the clamp slot 30. The handles 40 and 45 of the clamp 12 are then squeezed together causing the lower jaw 50 to extend through the slot 30 to a position below the guide plate 11 as illustrated at the left end of FIGS. 4 and 6. As the clamp handles are squeezed together it will be evident that with the clamp guide 42 restrained in the guide channel 32 the separation of the jaws 41 and 50 causes the lower jaw 50 to extend through the slot 30 to the position illustrated in FIG. 4. With the jaw 50 extending through the slot below the bottom surface 21 of the guide plate, the pressure plate 57 is reattached to the lower jaw by inserting the pin 59 through the holes 60 in the bracket 58 and the holes 65 in the lower jaw. The handles 40 and 45 are then released permitting the spring 56 to urge the handles back apart forcing the jaws 41 and 50 back together so that the pressure plate 57 now engages the bottom surface 21 of the guide plate with the plate fitting essentially flush with the bottom surface of the guide plate. The relationship of the clamp 12 and the guide plate 11 is illustrated in FIG. 1. The clamp 13 is then assembled with the guide plate 11 following the same installation steps. With both of the clamps 12 and 13 installed on the guide plate the guide tool of the invention appears as illustrated in FIG. 1 with the bottom of the tool appearing as in FIG. 5. Both the upper and lower handles 40 and 45 of both of the clamps 12 and 13 are above the top surface 20 of the guide plate so that the handles are readily accessible to an operator of the tool.

When use of the guide tool is desired, as for cutting a workpiece 14 such as a plywood panel, the guide tool is installed on the panel as illustrated in FIG. 4 and FIG. 6. First, a line, not shown, is drawn with a marking pen across the workpiece 14 along the line which it is desired to cut the workpiece. Depending upon the length of the guide plate 11, the width of the workpiece, and the size of the tool operator, the tool, installed by using clamps 12 and 13, may be operated by two workmen, or by a single one using both hands in the same time, or one hand at a time. The clamps 12 and 13 are adjusted along the guide plate to a distance apart wider than the workpiece 14 and less than the length of the slot 30 in the guide plate. This adjustment is effected by squeezing the handles of the clamps sufficiently that the lower jaw of each clamp moves below the guide plate enough to free the pressure plate 57 from contact with the lower face of the guide plate. Both of the clamps are moved in such a manner until the plates 57 of the clamps are farther apart than the width of the workpiece 14. Each clamp is then manipulated, either simultaneously or separately, squeezing the clamp handles together sufficiently to extend each of the lower jaws downwardly until the clamp pressure plates 57 are below lower surface of the workpiece 14. With the clamps so positioned, the clamps are moved, one toward the other, to engage the top surface of each pressure plate 57 with the bottom surface of the workpiece 14 as illustrated in FIGS. 4 and 6. As the clamps are moved, the guide edge 25 of the guide plate 11 is aligned with the marked line on the workpiece 14. The handles on each of the clamps are released so that the springs 56 urge the clamp jaws 41 and 50 of each clamp toward each other. The upper jaws 41 of each of the clamps urge the clamp guides 42 downwardly against the top surface 20 of the guide plate 11 urging the guide plate 11 against the top surface of the workpiece while simultaneously the lower jaws 50 of the clamps urge the clamp pressure plates 57 upwardly against the bottom surface of the workpiece 14 thereby clamping the workpiece at opposite sides of the workpiece between the bottom surface of the guide plate and the top surfaces of the clamp pressure plates 57 tightly holding the guide tool 10 on the workpiece. The workpiece may then be cut such as with a circular saw 15 as illustrated in FIGS. 4 and 6. A base plate 70 of the saw is placed on the workpiece with the back edge of the plate of the saw engaging the straight guide edge 25 of the guide plate 11. The saw is moved across the workpiece with the guide plate edge 25 guiding the saw along the desired straight line cut. When the cut is complete the clamp handles 40 and 45 are squeezed together releasing the clamp pressure plate 57 on each of the clamps 12 and 13 from the bottom of the workpiece, and the clamps are moved apart sufficiently to disengage the guide tool from the workpiece.

While the operation of the tool has been described in terms of cutting a workpiece, other work step functions may be performed, such as using the guide plate straight edge 25 to draw a line across the workpiece, and using the straight guide edge 25 to cut a workpiece such as a piece of plastic with a knife.

When the desired work has been completed with the tool, the clamps 12 and 13 may be left engaged with the guide plate 11, or, for easy transport and storage, may be disassembled from the guide plate. If disassembly is desired, the handles 40 and 45 of each clamp are squeezed together until the pressure plate 57 is moved sufficiently away from the bottom of the guide plate 11 to remove the pin 59 for taking the plate 57 off the lower jaw 50 of each clamp. After the plate 57 is removed, the clamp handles are relaxed and each of the clamps is withdrawn from the open end of the guide channel 32 by sliding the clamps out of the channel open ends past the opposite ends of the guide plate. The plates 57 may be reconnected with the clamps, or may be stored along with the clamp handles and jaws, the pin 59, the blades 57, and the guide plate, all being placed in a tool box for storage or movement to another job.

What is claimed is:

1. A guide tool comprising:

a guide plate having first and second opposite planar sides, first and second opposite ends, first and second opposite edges, the first of the edges extending substantially parallel with a longitudinal axis of the guide plate and serving as a tool guide edge, and a longitudinal slot opening through the first and second opposite planar sides having a longitudinal axis parallel with the tool guide edge and extending less than the length of the guide plate;

laterally spaced longitudinal flanges formed integral with the first planar side of the guide plate along opposite sides of the slot in the plate defining a guide channel along the first planar side of the guide plate, the guide channel extending longer than the length of the slot and being open at opposite ends;

at least two moveable clamps coupled with the guide plate along the guide channel and movable along the guide channel the length of the slot in the guide plate between the longitudinal flanges for releasably clamping the guide plate to a workpiece along the second planar side of the guide plate, the clamps each having handles extending between the flanges in a direction away from the first planar side of the guide plate, a first jaw of each clamp being engaged in sliding relationship with the guide plate in the guide channel and a second jaw of each clamp extending through the slot in the guide plate beyond the opposite second planar side of the guide plate; and clamping pressure plates, each plate being connected with the second jaw of each clamp and being extendable with the second jaw to a position spaced from the second opposite planer side of the guide plate to a position for insertion of a workpiece between the pressure plate and the second opposite planer side of the guide plate, the first and second jaws of each clamp being spring biased one toward the other to clamp a workpiece between the pressure plate on the second jaw of the clamp and the second opposite planer side of the guide plate for holding the guide plate on the workpiece with sufficient force to permit a tool to move along the guide edge of the guide plate to effect a desired work operation step on the workpiece.

2. A guide tool in accordance with claim 1 wherein the guide plate is rectangular in shape.

3. A guide tool in accordance with claim 1 wherein the pressure plate on each second jaw of each clamp is an elongated plate pivotally secured to each second jaw to permit the pressure plate to fit flush with the face of the workpiece against which each pressure plate is urged.

4. A guide tool in accordance with claim 1 wherein each first jaw of each clamp is secured with a clamp guide slidable in the guide channel and engagable with the first planar side of the guide plate for urging the guide plate against a workpiece when the workpiece is positioned between the second opposite planer side of the guide plate and the pressure plate on the second jaw of each clamp.

5. A guide tool in accordance with claim 4 wherein the guide channel is rectangular in cross section and each clamp guide on each first jaw of each clamp is formed of a central plate secured with the first jaw of the clamp having a width less than the width of the guide channel and aligned substantially parallel with the first planar side of the guide plate and side flanges attached along opposite sides of the central clamp guide plate of a width less than the thickness of the guide channel so that the clamp guide is slidable along the guide channel when the clamp is moved and the orientation of the clamp guide is maintained along the longitudinal axis of the guide channel as the clamp is moved.

6. A guide tool in accordance with claim 5 where each of the pressure plates on the second jaw of each clamp is rectangular in shape and pivotally connected with the second clamp jaw to permit each pressure plate to be urged against and flush with a surface of a workpiece clamped between the pressure plate and the second opposite planer side of the guide plate.

7. A guide tool in accordance with claim 6 wherein each movable clamp comprises the first and second jaw members each formed integral with a handle extending in the opposite direction from the jaw members and the handles are pivotally interconnected on opposite sides of a spring urging the handles apart and the first and second jaws each toward the other.

8. A guide tool comprising:

a planar guide plate having first and second planer surfaces and a straight guide edge, a longitudinal slot opening through said planar surfaces and extending along a longitudinal axis parallel to the guide edge, and guide flanges along opposite sides of the slot on the first planar surface of the guide plate defining a guide channel open at opposite ends and opening into the slot; and two opposed clamps slidably engageable with the guide plate for clamping the guide plate to a workpiece along opposite edges of the workpiece, each clamp having a first handle with a first integral jaw including a guide member slidable in the guide channel, and a second handle with an integral second jaw extendable through the slot beyond the second planar surface of the guide plate the second jaw including a pressure plate for engaging a workpiece and for clamping the guide plate to the workpiece, the first and second handles being spring biased to urge the first and second jaws toward each other, and the first and second handles extending in spaced relation from the first planar side of the guide plate when the clamps are coupled with the guide plate for access by a user from the first planer side of the guide plate.

* * * * *

UNITED STATES PATENT AND TRADEMARK OFFICE
CERTIFICATE OF CORRECTION

PATENT NO. : 5,964,041
DATED : October 12, 1999
INVENTOR(S) : Jerry R. Daniel

It is certified that error appears in the above-identified patent and that said Letters Patent is hereby corrected as shown below:

<u>Column 6,</u>
Line 21, replace "planer side" with -- planar side --.
Line 42, replace "planer side" with -- planar side --.

Signed and Sealed this

Twenty-sixth Day of March, 2002

Attest:

JAMES E. ROGAN
Attesting Officer    Director of the United States Patent and Trademark Office